Jan. 31, 1956  G. K. JONES  2,732,888
LOCKING MECHANISM FOR RECLINING SEATS
Filed Aug. 18, 1952
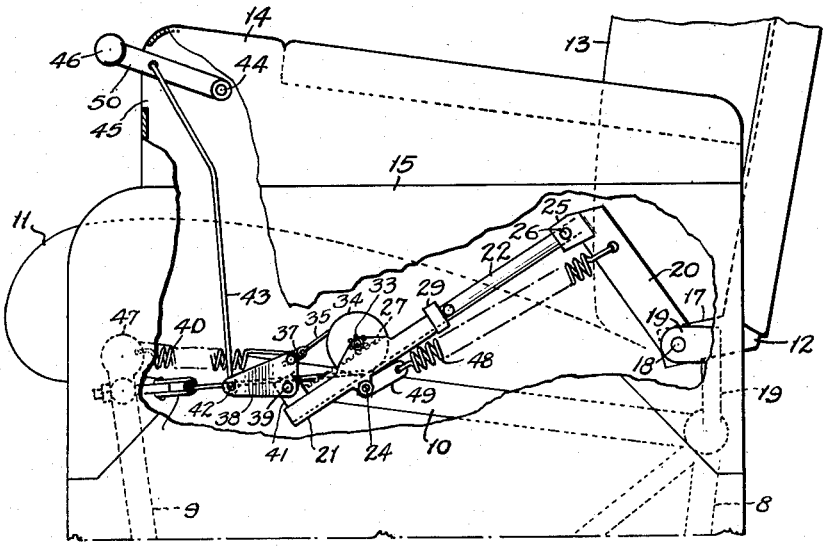
Fig. 1
Fig. 2
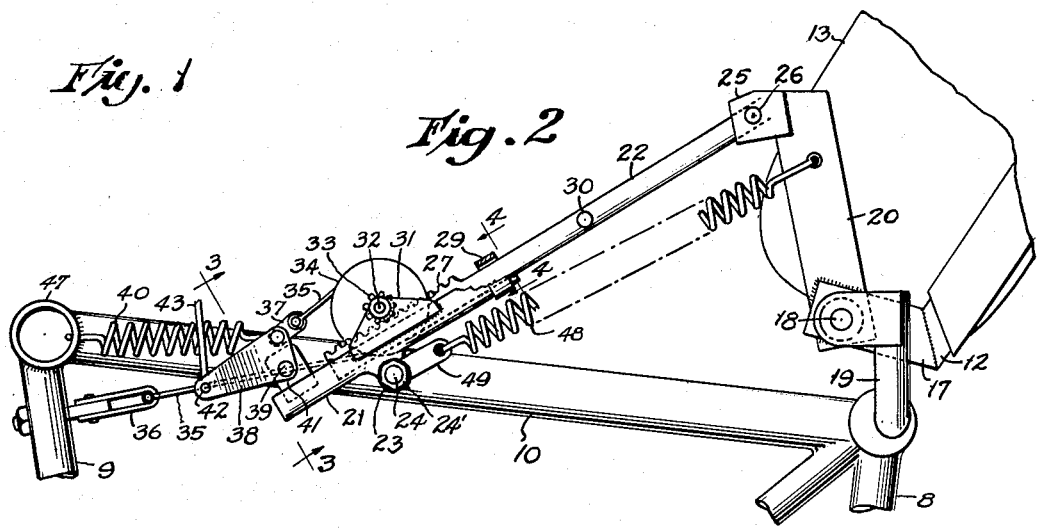
Fig. 3
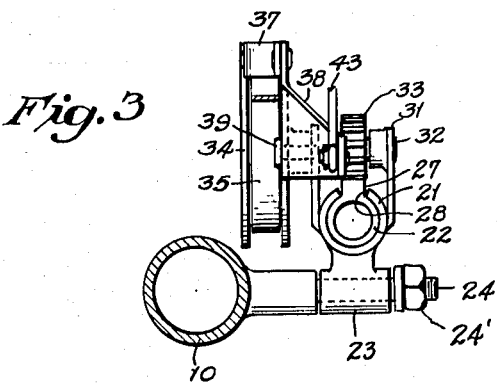
Fig. 4
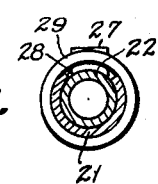
INVENTOR.
GORDON K. JONES
BY Sellers and Latta
—ATTORNEYS—

2,732,888
Patented Jan. 31, 1956

2,732,888
LOCKING MECHANISM FOR RECLINING SEATS

Gordon K. Jones, Burbank, Calif.

Application August 18, 1952, Serial No. 305,008

7 Claims. (Cl. 155—163)

This invention relates to reclining seats of the type used in passenger airplanes, railway coaches, busses, etc. The general object of the invention is to provide an improved locking mechanism for fixing the reclining back of a seat in selected positions of adjustment, and aims particularly to provide an infinite number of selective locking positions.

One of the objects of the invention is to provide a seat lock mechanism utilizing a rack, pinion and brake drum principle, embodied in a relatively simple yet effective connection between a seat back and a seat frame, with all of the mechanism contained within an upholstered arm of the seat.

Another object is to provide such an arrangement, including means for controlling the same from the forward tip of the arm rest.

Another object is to provide such an arrangement embodying spring means for urging the seat back forwardly, in opposition to pressure of the occupant's back for moving the seat back rearwardly, the spring means being incorporated as a part of an integral unit including the locking mechanism.

Other objects will become apparent in the ensuing specifications and appended drawings in which:

Fig. 1 is a side view of a portion of an aircraft seat embodying the invention, with sections of the upholstery covering removed to illustrate the locking mechanism;

Fig. 2 is a detail view of the locking mechanism with the seat in a partially reclined position;

Fig. 3 is a transverse sectional view taken on the line 3—3 of Fig. 2; and

Fig. 4 is a transverse sectional view taken on the line 4—4 of Fig. 2.

Referring now to the drawings in detail, I have shown, by way of example of one form in which the invention may be embodied, a portion of an aircraft seat including supporting legs 8, 9, supporting a seat frame, indicated generally at 10; a seat cushion 11 mounted on frame 10; a seat back including a frame 12 and a cushion 13 carried thereby; and arm rests 14 supported upon side members 15. An arm 14 may be in the form of a sheet metal shell, with a cushion extending along a major portion of the top thereof, and a side member 15 may likewise be in the form of a sheet metal shell, with appropriate upholstery covering all of the parts.

Back frame 12, which may be of welded tubular structure, has a pair of short extensions 17 projecting forwardly from the lower ends of the side members thereof, extensions 17 being pivoted, upon pivots 18, to brackets 19 projecting upwardly from the rear corners of seat frame 10. Secured to the extension 17, at pivot 18, and projecting upwardly therefrom, is a crank lever 20, which may be of flat bar stock, the seat lock and spring unit of my invention being attached to the upper end of this crank lever.

My improved seat lock mechanism includes a pair of telescoping links, one in the form of a channel 21 (preferably a slotted cylindrical tube) and the other a rod 22 (which may also be tubular for lightness); the channel 21 being pivoted to the side of seat frame 10, and the rod 22 being pivoted to the upper end of crank lever 20. Pivotal connection between channel 21 and frame 10 may comprise a short bushing 23 welded to the underside of channel 21, and a pivot stud 24, mounted in a boss on the side of frame 10, extending through bushing 23, and having a retainer nut 24' on its outer end. The pivotal connection of rod 22 to crank lever 20 comprises a clevis 25 fixed to the upper end of lever 20 and projecting forwardly therefrom, an a pivot pin 26 extending through the respective cheeks of the clevis and through the end of rod 22, embraced between said cheeks.

The end of rod 22 opposite its pivoted end is slidably received in channel 21. Channel 21 preferably comprises a slotted cylindrical tube, of roughly three quarters of a circumference in cross section, so as to have reentrant side walls adequately containing the rod 22 in secure axial alignment with the channel and preventing any cocking of the two links relative to each other. This end portion of rod 22 is provided with a rack 27, extending longitudinally thereof and projecting through the longitudinal slot 28 of channel 21. Rack 27 may comprise a separate rack bar welded to the side of tubular rod 22, although it will of course be understood that it would be possible to make the two integrally, as by stamping or coining the teeth 27 in an extruded portion of rod 22. A bridge element 29 unites the respective cheeks of channel 21, and provides a stop against which the rack 27 may engage in the fully extended condition of the mechanism. Bridge 29 may comprise a separate collar encircling the end of channel 21 and welded thereto as indicated.

Bar 22 is provided with a stop lug 30 for engagement with the end of channel 21, to limit the forward movement to the seat back. Stop lug 30 may comprise the head or nut of a bolt extended through rod 22, or simply a pin.

Channel 21 is provided with a pair of straight parallel ears 31 constituting extensions of the respective cheeks thereof. Journalled in ears 31 is a stub shaft 32 on which is secured a pinion 33 meshing with rack 27. Pinion 33 is disposed between ears 31. Secured upon one end of shaft 32 and disposed outside of channel 21 and ears 31, is a brake drum 34 in the form of a flanged pulley. A brake band 35 extends around brake drum 34. One end of band 35 is attached to a clevis 36 which in turn is anchored to a leg 9. The other end of brake band 35 is linked, by means of a short link 37, to one arm of a bell crank lever 38. Lever 38 may comprise simply a triangular shaped plate, with one corner thereof attached, by means of a pivot 39, to an ear 41 welded to the inner cheek of channel 21. A coil spring 40 has one end attached to the same arm of bell crank lever 38 as the brake band 35, the other end of coil spring 40 being anchored to the projecting end portion of the forward horizontal member 47 of seat frame 10. Spring 40 extends in a direction generally opposite to that of brake band 35, so as to tension brake band 35 against drum 34, thereby locking the pinion 33 against rotation and correspondingly locking the links 21, 22 against telescoping movement.

To the other arm of bell crank lever 38 is attached, by means of a pivot 42, a pull rod 43 which extends upwardly into the hollow forward portion of arm rest 14 and is linked to an operating lever 50. The inner end of lever 50 is pivoted, at 44, to a vertical wall of the shell portion of arm rest 14.

The forward portion of lever 50 projects through an opening 45 in the forward wall of arm rest 14.

The function of the locking mechanism described above is simply to establish a connection between the seat back and the seat frame, for locking the seat back in any selected position of adjustment. For actually moving the seat back between selected positions of adjustment, the invention provides a coil spring 48, one end of which is connected, through a link 49, to pivot stud 24, and the other end of which is anchored to crank lever 20 just below clevis 25. Thus the spring 48 lies immediately below the telescoping links 21, 22, and exerts a forward pull upon crank lever 20 for raising the seat back when the telescoping linkage is unlocked and when the seat occupant is not leaning backwardly against the seat.

The operator, by simply reaching downwardly over the forward end of arm rest 14, may engage a knob or handle 46 on the exposed forward end of operating lever 50, and by lifting the lever, will cause the bell crank lever 38 to rotate clockwise as viewed in the drawing, thereby unloading the brake band 35, i. e. taking the load of spring 40 off of the brake band.

As the seat back is moved between its upright and reclining positions, there will be a slight amount of teetering movement of the links 21, 22 about the pivot 24, although the crank lever 20 is positioned so as to minimize this arc of movement. Such teetering movement as does occur, however, will cause some swinging movement of brake drum 34 about pivot 24. In order that this swinging movement may not affect the tension in band 35, bell crank lever 38 is attached to the forward end of channel 21, and its fulcrum 39 will move with the movement of the other parts of the telescoping link assembly, thus maintaining a fixed position relative to brake drum 34. Spring 40 will elongate and retract slightly to accommodate such swinging movement of the fulcrum 39, but the change in spring length is not sufficient to materially alter the tension in brake band 35, the band remaining fully tensioned, from the functional standpoint, in all positions of adjustment of the seat back, subject only to the unloading of the brake band by actuating the operating lever 50.

In the normal position of bell crank lever 38, which is shown in Fig. 2, its long arm (to which pull rod 43 is attached) projects downwardly and its short arm (to which spring 40 and brake band 35 are attached) projects forwardly. Pull rod 43 projects upwardly ahead of pivot 39, so that when pulled upwardly, it will be effective to swing the bell crank 38 in a clockwise direction. In the fully raised position of operating lever 50, bell crank 38 assumes a position in which the short arm projects upwardly and the long arm projects in a generally forward direction. This position is shown in Fig. 1, and brake band 35 is correspondingly shown in a slack condition.

As soon as the operator releases lever 50, spring 40 will automatically return the bell crank 38 to the position shown in Fig. 2, tensioning the brake band 35.

*Operation*

By leaning forwardly and unlocking the linkage, the seat back will be drawn forwardly by spring 48, whereas by unlocking the linkage and leaning backwardly against the seat back, the latter may be caused to recline to any selected position. This general method of operating a reclining seat back, with the operator leaning against the back to cause it to recline and with a spring for drawing it forwardly is of course a commonly used arrangement in reclining seats. The invention does, however, provide an efficient and compact arrangement of operating spring and infinitely variable locking means in a unit combination which may be easily applied to any conventional reclining back seat. The use of the telescoping links for establishing the actual locking connection between the back and the seat frame, provides a very sturdy, dependable and long lived construction. The use of the brake drum and brake band, pinion and rack construction together with the band loading spring and the bell crank, carried by the telescoping links for loading and unloading the brake band, provides a very efficient means for controlling the locking mechanism from a convenient control point at a substantial distance above the actual locking linkage, without encountering any difficulty in maintaining the proper tension in the brake band throughout the range of teetering movement of the linkage.

I claim:

1. In a reclining seat: a seat frame; a seat back frame hinged to said seat frame for reclining movement; a pair of telescoping links comprising a channel member and a bar slidable therein, outer ends of said links being connected respectively to said seat frame and to said back frame for telescoping movement of said links in response to reclining movement of said back frame; and means to lock said links against telescoping movement so as to fix said back frame in a selected position of adjustment, said means comprising rack teeth on said bar, exposed at the open side of said channel, a pair of ears on respective sides of said channel, projecting above said rack teeth, a shaft journalled in said ears and extending transversely over said rack teeth, a pinion fixed to said shaft between said ears and meshing with said rack teeth, a brake drum fixed to said shaft outside said channel, a brake band extending around said brake drum, and manually releasable means for tightening said brake band.

2. In a reclining seat: a seat frame; a seat back hinged thereto for reclining movement; a pair of substantially aligned links connected together for longitudinal sliding movement, one of said links being connected to the seat back and the other to the seat frame, said links extending and retracting in response to hinging movement of said seat back; and means for locking said links against relative movement so as to fix the seat back in a selected position of adjustment, said locking means comprising a rack on one of said links, a pinion journalled on the other link and meshing with said rack, a brake drum fixed to said pinion, a brake band encircling said brake drum, a bell crank pivotally mounted on said other link, a coil spring connected under tension between an arm of said bell crank and said seat frame and constantly applying tension to said bell crank, the latter being connected to said brake band and normally loading the same with the tension received from said spring, a manually operable lever pivoted to the seat above said bell crank, for vertically swinging movement, and a pull link connected between said lever and another arm of said bell crank for unloading the brake band.

3. In a reclining seat: a seat frame; a seat back hinged thereto for reclining movement; a pair of substantially aligned links connected together for relative longitudinal sliding movement, one of said links being connected to the seat back and the other to the seat frame; a coil spring anchored at one end to said other link and at its other end to the seat back adjacent the connection of said one link thereto, said links extending and retracting in response to hinging movement of said seat back; and means for locking said links against relative movement so as to fix the seat back in a selected position of adjustment, said locking means comprising a rack on one of said links, a pinion journalled on the other link and meshing with said rack, a brake drum fixed to said pinion, a brake band encircling said brake drum, a bell crank pivotally mounted on said other link, a coil spring connected under tension between an arm of said bell crank and said seat frame and constantly applying tension to said bell crank, the latter being connected to said brake band and normally loading the same with the tension received from said spring, a manually operable lever pivoted to the seat above said bell crank, for vertically swinging movement, and a pull link connected between said lever and another arm of said bell crank for unloading the brake band.

4. In a reclining seat: a seat frame; an arm rest carried by said frame in an elevated position; a seat back hinged to said seat frame for reclining movement; a pair of substantially aligned links connected together for longitudinal sliding movement, one of said links being connected to the seat back and the other to the seat frame, said links extending and retracting in response to hinging movement of said seat back; a coil spring anchored at one end to said other link and at its other end to the seat back adjacent the connection of said one link thereto, for urging said seat back forwardly; and means for locking said links against relative movement so as to fix the seat back in a selected position of adjustment, said locking means comprising a rack on one of said links, a pinion journalled on the other link and meshing with said rack, a brake drum fixed to said pinion, a brake band encircling said brake drum, a bell crank lever pivoted to and carried by said other link, said bell crank lever having respective arm portions projecting upwardly and forwardly from said pivotal connection to said other link, resilient means connected under tension between said seat frame forwardly of said bell crank, and said upwardly projecting bell crank arm portion for constantly applying tension to the latter, said upwardly projecting arm portion being connected to said brake band and normally loading the same with the tension received from said resilient means, and manually operable means including a pull link connected to said forwardly projecting bell crank arm portion and extending upwardly to said arm rest, and an operating lever pivoted to said arm rest and to said pull link, for unloading the brake band.

5. In a reclining seat: a seat frame; a seat back frame hinged thereto for reclining movement; an arm secured to the back frame in a position inclined upwardly and forwardly when the back frame is upright; a pair of telescoping links, one of which is connected to said arm near the upper end thereof and the other of which is anchored to the seat frame; a coil spring one end of which is anchored to said other link and the other end of which is anchored to said arm near the uper end thereof, with the spring under tension and tending to raise the back frame to said upright position; said links comprising a channel and a bar slidable therein; and means to lock said links against telescoping movement so as to fix said back frame in a selected position of adjustment, said locking means comprising rack teeth on said bar, exposed at the open side of said channel, a pair of ears on respective sides of said channel, projecting above said rack teeth, a shaft journalled in said ears and extending transversely over said rack teeth, a pinion fixed to said shaft between said ears and meshing with said rack teeth, a brake drum fixed to said shaft outside said channel, a brake band extending around said brake drum, yielding resilient means normally applying tension to said brake band for locking said brake drum against rotation and thereby locking the said links against relative movement; and manually operable means for unloading the brake band so as to release said brake drum for rotation and thereby allow extension or retraction of said links in response to pressure of a seat occupant's back against said seat back or the pull of said coil spring, as the case may be.

6. In a reclining seat: a seat frame; a seat back frame hinged thereto for reclining movement; an arm secured to the back frame in a position inclined upwardly and forwardly when the back frame is upright; a pair of telescoping links including a channel having a pair of cheeks, spaced to define a longitudinal slot, and a bar having one end portion slidable in said channel, said one end portion of the bar having rack teeth exposed in said slot; a pair of bearings carried by the respective cheeks of said channel; a shaft journalled in said bearings and extending transversely over said rack teeth; a pinion fixed to said shaft between said bearings and meshing with said rack teeth; a brake drum fixed to an end of said shaft outside said channel; a brake band extending around said brake drum; said links being inclined downwardly and forwardly from the upper end of said arm to said seat frame, with said bar pivotally connected to said upper end of the arm and said channel having on its under side a transversely extending bearing, a pivot stud extending through said bearing and mounted in the side of said seat frame for pivotally connecting said channel to the seat frame; a bell crank pivotally mounted on said channel and having a portion thereof extending generally upwardly and another portion thereof extending generally forwardly, resilient means connected under tension between said seat frame and said upwardly extending crank portion and exerting a forward pull against said bell crank, said brake band having one end thereof anchored to said seat frame and the other end connected to said upwardly extending crank portion and tension loaded by the pull of said resilient means; an arm rest carried by said seat frame at a height thereabove; an operating lever pivotally connected to the forward portion of said arm rest, and a pull rod connected to said operating lever, extending downwardly, and connected to said forwardly extending bell crank portion, whereby upward movement of said operating lever will unload said brake band to allow rotation of said brake drum and thereby permit extension of said telescoping links and swinging movement of said seat back.

7. A reclining seat as defined in claim 1, including a coil spring having one end connected to said pivot stud and its other end connected to said back frame arm just below the connection of said telescoping rod thereto, said coil spring being under tension and exerting a forward pull against the seat back frame for urging the same forwardly.

References Cited in the file of this patent
UNITED STATES PATENTS

| | | |
|---|---|---|
| 685,371 | Davis et al. | Oct. 29, 1901 |
| 972,334 | Casassa | Oct. 11, 1910 |
| 1,773,597 | Myerson | Aug. 19, 1930 |
| 2,133,471 | Opperman | Oct. 18, 1938 |
| 2,273,428 | Bank | Feb. 17, 1942 |
| 2,645,275 | Wong | July 14, 1953 |